(12) United States Patent
Gillett et al.

(10) Patent No.: US 6,689,499 B2
(45) Date of Patent: Feb. 10, 2004

(54) PRESSURIZED SOLID OXIDE FUEL CELL INTEGRAL AIR ACCUMULAR CONTAINMENT

(75) Inventors: James E. Gillett, Greensburg, PA (US); Paolo R. Zafred, Murrysville, PA (US); Richard A. Basel, Pittsburgh, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 105 days.

(21) Appl. No.: 09/954,942

(22) Filed: Sep. 17, 2001

(65) Prior Publication Data

US 2003/0054210 A1 Mar. 20, 2003

(51) Int. Cl.[7] .............................. H01M 8/02; H01M 8/12
(52) U.S. Cl. .............................. 429/13; 429/31; 429/34
(58) Field of Search .............................. 429/30, 31, 32, 429/34, 38, 39, 13

(56) References Cited

U.S. PATENT DOCUMENTS

| | | | |
|---|---|---|---|
| 3,972,731 A | | 8/1976 | Bloomfield et al. |
| 4,342,816 A | * | 8/1982 | Kothmann et al. ....... 429/38 X |
| 4,395,468 A | | 7/1983 | Isenberg |
| 4,622,275 A | | 11/1986 | Noguchi et al. |
| 4,904,547 A | * | 2/1990 | Mizumoto et al. ........ 429/34 X |
| 5,169,730 A | | 12/1992 | Reichner et al. |
| 5,413,879 A | | 5/1995 | Domeracki et al. |
| 5,532,072 A | * | 7/1996 | Spaeh et al. .................. 429/34 |
| 5,573,867 A | | 11/1996 | Zafred et al. |
| 5,688,610 A | * | 11/1997 | Spaeh et al. .................. 429/30 |
| 5,750,278 A | | 5/1998 | Gillett et al. |
| 5,914,200 A | * | 6/1999 | Schabert et al. ............... 429/34 |
| 6,255,010 B1 | * | 7/2001 | George et al. ................. 429/30 |
| 2002/0110716 A1 | * | 8/2002 | Holmes et al. ............... 429/31 |

FOREIGN PATENT DOCUMENTS

JP  8-298131  * 11/1996  ............ H01M/8/24

OTHER PUBLICATIONS

Holmes et al. U.S. Ser. No. 09/784,610, filed Feb. 15, 2001.
Westinghouse Electric Corp. "Solid Oxide Fuel Cell", pp 1–12, Oct. 1992.
S.E. Veyo, "The Solid Oxide Fuel Cell Technology of the Siemens Westinghouse Power Corporation", presentation slides 25–33, Apr. 27, 2001, Milan, Italy.

* cited by examiner

Primary Examiner—Stephen Kalafut (57) ABSTRACT

A fuel cell generator apparatus contains at least one fuel cell subassembly module in a module housing, where the housing is surrounded by a pressure vessel such that there is an air accumulator space, where the apparatus is associated with an air compressor of a turbine/generator/air compressor system, where pressurized air from the compressor passes into the space and occupies the space and then flows to the fuel cells in the subassembly module, where the air accumulation space provides an accumulator to control any unreacted fuel gas that might flow from the module.

17 Claims, 6 Drawing Sheets

PRESSURIZED SOLID OXIDE FUEL CELL INTEGRAL AIR ACCUMULAR CONTAINMENT

GOVERNMENT CONTRACT

The Government of the United States of America has rights in this invention, pursuant to Contract No. DE-FC26-97FT-34139 with the United States Department of Energy.

BACKGROUND OF THE INVENTION

1. Field of the Invention

The invention relates to purge gas protected, pressurized, solid oxide electrolyte, fuel cell generator modules, with a gas feed system effective to react with unreactive fuel at shutdown, and to an array of such generator modules for use with a variety of auxiliary components in a power generation system of 100 kW to 50 MW plus capacity.

2. Background Information

Fuel cell based, electrical generator apparatus utilizing solid oxide electrolyte fuel cells ("SOFC") arranged within a housing and surrounded by insulation are well known, and taught, for example, by U.S. Pat. No: 4,395,468 (Isenberg); U.S. Pat. No. 5,169,730 (Reichner); U.S. Pat. No. 5,750,278 (Gillett et al.); U.S. Patent Application Publication No.: 2002/0110716A1 U.S. Ser. No. 09/784,610 (Holmes et al. -Docket No. 0E 7684 US), and "Solid Oxide Fuel Cell", Westinghouse Electric Corporation, pp 1–12, October, 1992. Tubular type fuel cells can comprise an open or close ended, axially elongated, self-supporting, ceramic tube air electrode material, completely covered by thin film ceramic, solid electrolyte material. The electrolyte layer is covered by cermet fuel electrode, except for a thin, axially elongated, interconnection material.

Flat plate type fuel cells can comprise a flat array of electrolyte and interconnect walls, where electrolyte walls contain thin, flat layers of cathode and anode materials sandwiching an electrolyte. "Corrugated" plate type fuel cells can comprise a triangular or corrugated honeycomb array of active anode, cathode, electrolyte and interconnect materials. Other fuel cells not having a solid electrolyte, such molten carbonate fuel cells are also well known, and can be utilized in the article and method of this invention.

Development studies of SOFC power plant systems have indicated the desirability of pressurized operation. This would permit operation with a coal gasifier as the fuel supply and/or use of a gas turbine generator as a bottoming cycle. Integration is thought commercially possible because of the closely matched thermodynamic conditions of the SOFC module output exhaust flow and the gas turbine inlet flow.

Conventional combustor in a gas turbine system typically exhibit high nitrogen oxides (NOx) emissions, combustion driven oscillations and instabilities, excessive noise and low efficiencies. Although significant advances have been made to mitigate these problems, it has proved difficult to design a practical, ultra-low NOx, high-turn-down ratio combustor due to poor flame stability characteristics. The combination of all the above factors results in pressurized SOFC generator module design being suitable as a replacement of conventional gas turbine combustor and applicable to more efficient combined cycle power plants required to meet increasingly stringent emission targets.

A variety of fuel cell uses in power plant systems are described in the literature. In U.S. Pat. Specification No. 3,972,731 (Bloomfield et al.), a pressurized fuel cell power plant is described. There, air is compressed by compressor apparatus, such as a compressor and turbine which are operably connected, which is powered by waste energy produced by the power plant in the form of a hot pressurized gaseous medium, such as fuel cell exhaust gases. These exhaust gases are delivered into the turbine, which drives the compressor for compressing air delivered to the fuel cells. In U.S. Pat. Specification No. 5,413,879 (Domeracki et al.) a pressurized SOFC is also integrated into a gas turbine system. There, pre-heated, compressed air is supplied to a SOFC along with fuel, to produce electric power and a hot gas, which gas is further heated by combustion of unreacted fuel and oxygen remaining in the hot gas. This higher temperature gas is directed to a topping combustor that is supplied with a second stream of fuel, to produce a still further heated gas that is then expanded in a turbine.

U.S. Pat. No. 4,622,275 (Noguchi et al.) also describes a fuel cell power plant, where reformed, reactive fuel if fed to an anode of the cell, an expansion turbine connected to a compressor feeds compressed gas into the cathode of the cell, which compressed gas is mixed with anode exhaust gas which had been combusted.

Fuel cell pressurization, while advantageous in system performance, presents several practical difficulties to the SOFC generator designer, two of which are: (1) The pressure boundary must be able to withstand pressures up to 20 atmospheres; (2) Because fuel and air are brought together within the SOFC generator, care must be taken to avoid the potential of an unstable condition during startup, operation, and especially during regular and emergency shutdown. For atmospheric operation, the expected explosive overpressure would be about 115 psi (792.4 kPA) which existing designs can accommodate by mechanical strength alone. However, the expected explosive overpressure at 20 atmospheres is about 2315 psi (15950 kPA). A protective containment system to prevent the accumulation of an explosive gas mixture is required.

Many of these problems were solved by U.S. Pat. Specification No. 5,573,867 (Zafred et al.). There, a separate source of a purge gas of, for example air, argon or nitrogen was fed to a purge gas volume between the SOFC modules and the outer containment pressure vessel housing the modules. Separate air and gaseous fuel sources were fed to the SOFC modules. The large amount of compressed air required use of large air manifolds passing through the purge air volume and into the air electrodes of the modules. Zafred et al. recognized that a purge gas space was necessary to control any unreacted fuel gas flow from the modules by dilution with the purge gas.

An even more serious problem can occur, if, for some reason, the gas turbine generator system shuts down in an emergency situation, or even just for normal servicing. What results is that the sole source of SOFC feed air from the turbine generator's compressor is cut off, with possible unreacted fuel still remaining in the SOFC modules, especially if there is an unexpected emergency.

This problem could be addressed by providing a plurality of pressurized, auxiliary air sources, such as bottled pressurized air or a high pressure auxiliary air compressor feeding into the normal low pressure auxiliary air source, as described in S. E. Veyo "The Solid Oxide Fuel Cell Technology of the Siemens Westinghouse Power Corporation" presentation slides 25–33, Apr. 27, 2001, Milan, Italy. There, for a 220 kWe SOFC/turbine generator system, pumped auxiliary air and pressurized tank auxiliary air were used as back-up air sources. The air could be fed by piping into the fuel cells, or fed by separate piping through the SOFC pressure vessel to a duct-burner, to mix with exhaust and fresh fuel to power a gasifier. This solution would take up substantial space, require complicated valving and pumping means exterior to the SOFC module's pressure vessel, a sophisticated control system, and in the case of a separate, stand alone, emergency compressor, would be quite costly.

What is needed is an inexpensive source of high pressure emergency auxiliary air available to be fed into the air inlets of the SOFC modules in the correct proportions to burn unreacted fuel, eliminating the possibility of an explosive fuel-air gas mixture being generated during depressurization. What is also needed is a simple source of high pressure air that can substitute for a stand alone high pressure auxiliary air compressor. Therefore, it is one of the main objects of this invention to provide an inexpensive and simple means to supply highly pressurized air to pressurized SOFC modules in a shut-down situation, in the correct air fuel proportions, to react/burn any unreacted fuel. It is another main object of the invention to simplify the entire feed arrangement relating to pressurized air, especially at emergency shut-down.

SUMMARY OF THE INVENTION

These and other objects of the invention are accomplished by providing a fuel cell generator apparatus characterized by containing at least one fuel cell assembly module containing a plurality of fuel cells, each fuel cell having electrolyte between an air (oxidant) electrode and a fuel electrode; a module housing enclosing the module; a pressure vessel having two ends surrounding the module housing, such that there is an air accumulation space between the module housing and the pressure vessel; where the pressure vessel has fuel gas inlet tubing connecting to a module fuel gas inlet; an air compressor associated with a gas turbine generator system for supplying compressed air; a compressed air inlet connecting to the air accumulation space where air occupies the air accumulation space and then flows to a module air inlet; and an exhaust gas outlet connecting to a module exhaust gas outlet; where the air accumulation space provides an air accumulator with sufficient volume to control any unreacted fuel gas flow from the module by dilution with air and to react with any unreacted fuel gas within the module upon shutdown of the apparatus, such as upon shut-down of the air compressor. The volume rates of free fuel:free air within the fuel cell generator apparatus is from about 1:3–6, that is from about 1:3 to from about 1:6.

The fuel cells are preferably tubular solid oxide electrolytic fuel cells and they will generally operate at temperatures over about 650° C., up to about 1100° C. The module housing and the fuel cells operate in the "pressurized" mode, that is over at least about 2 atmospheres, or about 28.5 psi (pounds per square inch 196.4 kPA), and preferably at about 2 to 10 atmospheres. The air compressor of an associated gas turbine-generator will be the sole source of air/oxidant to the fuel cell generator. During operation, after depressurization, a small air blower supplies air to the cells during cooling. In all cases it is essential that the compressed air be at a higher pressure than the fuel gas; usually from 0.5 atm to 5.0 atm (50.6 kPA to 506 kPA) higher so no fuel can enter the purge gas space.

The invention also resides in a method of operating a fuel cell generator apparatus characterized by: (1) passing fuel gas, through a fuel inlet and into a plurality of fuel cell assembly modules, each module containing a plurality of fuel cells, each fuel cell having electrolyte between an air (oxidant) electrode and a fuel electrode, where the modules are each enclosed by a module housing and where the module housings are surrounded by an axially-elongated pressure vessel having two ends, such that there is an air accumulation space between the module housings and the pressure vessel, the fuel gas also passing through the pressure vessel enclosing the modules and through a tube within the air accumulation space to the fuel inlet; (2) passing pressurized air from an air compressor associated with a gas turbine generator through the pressure vessel into the air accumulation space to circulate within the air accumulation space, where the air then passes into the module through an air inlet, where the oxidant gas dilutes any unreacted fuel gas flow from the module and where the air accumulation space provides an air accumulator with sufficient volume to react with any unreacted fuel gas; and (3) passing exhaust gas and any unreacted fuel gas out of the pressure vessel; where the accumulated air will react with any unreacted fuel gas if the air compressor is shut-down. Preferably the pressure vessel is tubular.

The generator apparatus can operate at interior temperatures up to 1100° C. in a flow of fuel, and oxidant such as air. The generator apparatus will have associated with it and will be working in cooperation with well known auxiliaries, such as controls; an oxygen or air pre-heater; a fuel gas compressor; a fuel desulfurizer; an air compressor which may by operably connected to a power turbine coupled to an electric generator; a source of fuel gas; heat exchangers; a heat recovery unit to recover heat from the hot fuel cell exhaust gases; and a topping combustor, to provide an electrical power generation system. This type power system could be, for example, part of an integrated, coal gasification/fuel cell-steam turbine combination power plant, featuring a plurality of coal gasifiers and fuel cell generator arrays or power blocks with associated DC/AC conversion switchgear. This type power system could also be part of a natural gas fired combustion turbine system, or the like.

This pressurized fuel cell generator apparatus design provides a unique safety feature for fuel cell operation, and is an easily transportable assembly. By combining several modules within the pressure vessel, it is possible to operate the fuel cells at high pressure, thus greatly improving overall SOFC module voltage, efficiency and power output to the extent that it becomes feasible to integrate this apparatus with an industrial gas turbine in a high efficiency combined cycle power plant. This integration is possible because of the closely matched thermodynamic conditions of the SOFC module output exhaust flow and the gas turbine inlet flow. In other words, the SOFC module acts as a conventional combustor in a gas turbine and it provides the volumetric flow rate, at the required temperature and pressure, which is discharged through the turbine.

Integration of these pressurized SOFC modules with conventional gas turbines in a combined cycle power plant, can boost overall electrical efficiencies to 65% to 70%, providing values presently unmatched by any other power generation technology. The pressurized SOFC generator modules will result in a design that can be used with the full range of existing commercial combustion turbines and will not require major modification to the units.

BRIEF DESCRIPTION OF THE DRAWINGS

For a better understanding of the invention, reference may be made to the preferred, non-limiting embodiments exemplary of the invention, shown in the following drawings, in which.

DESCRIPTION OF THE PREFERRED EMBODIMENTS

The fuel cells used inside the generator apparatus of this invention can be solid oxide electrolyte or molten carbonate fuel cells of any type or configuration. However, for purposes of simplicity, tubular, solid oxide electrolyte fuel cells will be discussed as an exemplary type useful in this invention, and the description herein-after will generally relate to that type, which shall in no way be considered limiting as to the scope of the invention.

Solid oxide electrolyte fuel cells (SOFC) are highly efficient devices that convert chemical energy into electricity. They operate at atmospheric or elevated pressures at a temperature of approximately 1000° C. to produce electricity using a variety of fossil fuels such as coal derived fuel gas, natural gas, or distillate fuel. The temperature of the exhaust gases from the cells is between 500° C. to 850° C., a temperature which is attractive for co-generation applications or for use in bottoming cycles for all-electric central station power plants.

An operating SOFC readily conducts oxygen ions from an "air" electrode (electrode which air or oxidant contacts-cathode), where they are formed, through a solid electrolyte to a "fuel" electrode (electrode which fuel contacts-anode). There they react with carbon monoxide (CO) and hydrogen ($H_2$) contained in the fuel gas to deliver electrons and produce electricity. The tubular SOFC features a porous air electrode made of doped lanthanum manganite. A gas-tight electrolyte of yttria-stabilized zirconia (approximately 40 micrometers thick) covers the air electrode, except in a strip about 9 mm wide along the entire active cell length. This strip of exposed air electrode is covered by a thin, dense, gas tight layer of doped lanthanum chromite. This layer, termed the cell interconnection, serves as the electric contacting area to an adjacent cell or to a power contact. The fuel electrode is a nickel-zirconia cermet and covers the electrolyte surface except in the vicinity of the interconnection.

For operation, gaseous oxidant, typically air is introduced into the fuel cell, generally through an air feed tube. The air, discharged near the closed end of the cell, flows through the annular space formed by the cell and its coaxial feed tube. Gaseous fuel flows on the outside of the cell. Typically, 85% of the fuel is electrochemically utilized (reacted) in the active fuel cell section. The gas-impervious electrolyte does not allow nitrogen to pass from the air side to the fuel side, hence the fuel is oxidized in a nitrogen free environment, averting the formation of NOx. At the open end of the cell, the remaining fuel is reacted with the air stream exiting the cell, thereby providing additional useful heat. Reformation of natural gas and other fuels containing hydrocarbons can be accomplished, if desired, externally or within the generator. Incoming fuel can be reformed to $H_2$ and Co within the generator, eliminating the need for an external reformer. All the gas flows and reactions are controlled within the generator apparatus.

To construct an electric SOFC generator, individual cells are bundled into an array of series-parallel electrically connected fuel cells, forming a structure that is a basic generator building block. The individual bundles are arrayed in series to build generator voltage and to form submodules. The parallel electrical connection of the cells within a bundle enhances generator reliability. Submodules are further combined in either parallel or series connections to form the generator module. For a more complete description of tubular fuel cells and their operation in a generator apparatus, reference can be made to U.S. Pat. No. 4,395,468 (Isenberg).

Figure 1:
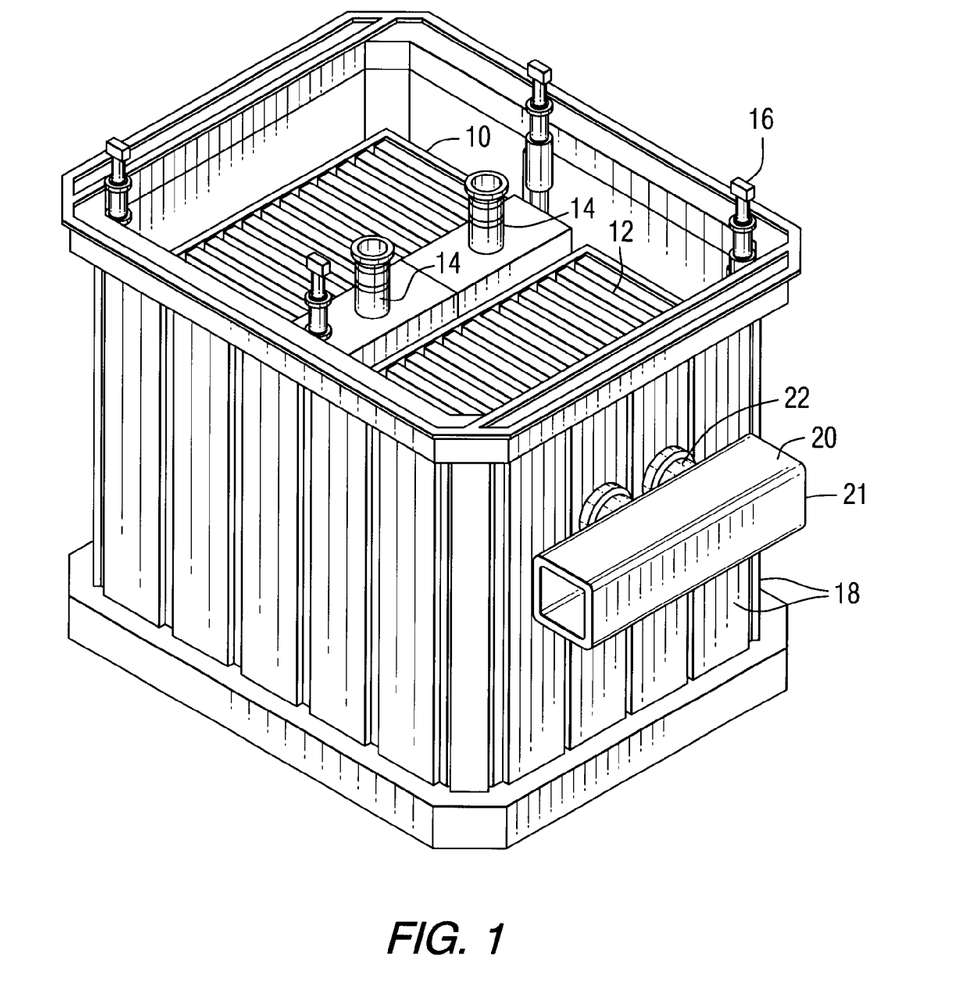
FIG. 1, shows a three dimensional top view of two fuel cell stack modules in a surrounding module housing, where two fuel pre-reformers are between the assembly modules, and where optional side air exit manifolds are also shown.

Referring now to FIG. 1 of the drawings, one embodiment of two fuel cell stack subassembly modules 10 and 12 are shown with feed fuel ducts 14. The module housing 18 can contain one or more subassembly modules with any associated recirculation plenums and pre-reformer assemblies. The module housing must contain fuel cells operating at temperatures of 800° C. to 1100° C. and must be made of material, generally metal, capable of withstanding temperatures of 600° C., such as iron, steel, stainless steel or nickel alloy. The housing 18 is shown, as a rounded off square, but it can be other configurations. Also shown is one example of optional air exit plenums 20 with end 21. Pressurized air can exit the modules. Attachment means 16, such as flanged connections, are shown at the top of the housing 18 to bolt or otherwise attach an exhaust gas or other manifolds (not shown).

Figure 2:
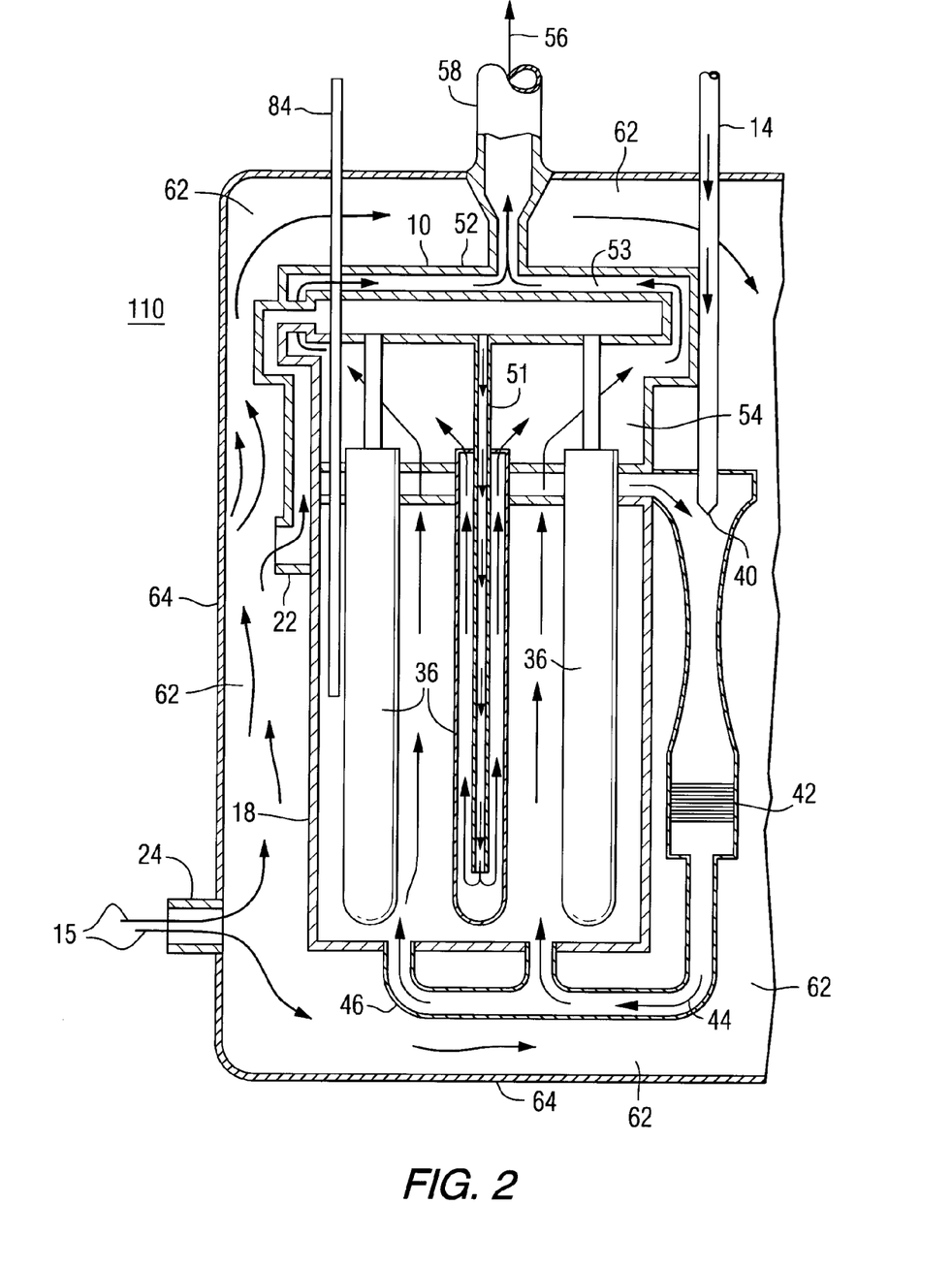
FIG. 2, shows one embodiment of a gas flow schematic of a fuel cell generator apparatus.

FIG. 2 is a gas flow schematic of one embodiment of a possible fuel cell generator apparatus 110 design simplified for purposes of clarity. Main air entry 24 for the air 15 is shown on the side of the pressure vessel 64 for purposes of illustrating gas flow, but it is usually on the end (not shown) of the pressure vessel, which can be cylindrical. The entry air into the module housing can be on the sides, top or bottom. In any case, as can be seen, the pressurized air is not constrained within any piping or ducts as for example fuel entry duct 14, but passes into and occupies the air accumulation volume or space 62 before entering the module 18. While one type of air entry from module air inlet 22 to the fuel cells 36 is shown, any suitable ducting is within the invention.

FIG. 2 also shows fuel cell bundles, each bundle containing a plurality of interconnected fuel cell 36 bundles, here shown as of the tubular SOFC type, with electrodes and sandwiched electrolyte. The housing 18, must contain interior insulation and may have exterior insulation partly between the housing and the surrounding pressure vessel 64 to allow use of metals described above as the housing material. The exterior insulation can contain cooling ducts around its periphery. Any insulation 66, shown in FIG. 3A, used would be gas permeable and from about 40 vol. % to 90 vol. % porous, and preferably would be alumina-silica fiber board. Fuel would enter fuel inlet duct or piping 14 and pass, preferably to one or more ejectors 40, where recirculation gases may inject-mix with feed fuel, to provide a stream useful in the fuel conditioning or pre-reforming section 42, where it is at least partially reformed, and to otherwise provide optimal operating conditions. The fuel stream 44 then exits pre-reformer 42 and passes through a fuel plenum 46 and into fuel supply lines which transfer or pass at least partly reformed fuel to the outside of the fuel cells 36, as shown in FIG. 2, where the fuel reacts along the elongated fuel electrode surface on the exterior of the tubular fuel cells 36. The fuel can be more complete reformed within the fuel bundles.

As shown in FIG. 2, pressurized air enters an air distribution plenum, and then passes downward via individual oxidant feed tubes 51, shown in FIG. 2 into the bottom interior of each fuel cell 36, where, as is well known in the art, the oxidant reverses flow and passes in the annular space between the oxidant feed tube and the interior air electrode, where it reacts along the electrode interior surface. The reacted oxidant finally enters a combustion chamber section 54 as spent oxidant. The spent oxidant then combusts with spent fuel, and some remaining unreacted feed fuel, to provide exhaust gas 56, which passes through a combustion or combusted gas plenum 53 to exhaust duct 52 and outlet 58. Part of the spent fuel may also be recirculated to the ejector 40, as shown in FIG. 2. A power lead 84 is also shown in FIG. 2. Further details on these flow patterns as well as use of an ejector system can be found in U.S. Pat. Specification No. 5,169,730 (Reichner).

Very importantly, especially during pressurized operation, it may be possible, that some fuel is not utilized, that small volumes of unreacted fuel have the opportunity to diffuse or leak into the gas space 62 outside the fuel cell assembly modules and module housing. Any unreacted fuel outside module housing wall 18 may ignite under certain conditions because the auto ignition temperature of feed fuel, such as hydrogen, is about 520° C. As described previously, fuel leakage into volume, or space 62, which has a temperature gradient from 25° C. to 600° C. could possibly provide an unstable/combustion problem. This invention provides a means to control the possibility of such combustion, and an even more dramatic situation if the source of oxygen should be cut off as by shutdown of the compressor of an associated turbine generator.

Prevention of combustion takes advantage of the fact that both air and a fuel must be present in the proper proportions for combustion to occur. The combustion of gaseous fuels will occur only within a limited range of fuel concentration in air. If the fuel concentration is lower or higher than the flammability limits, combustion will not occur. Such prevention of combustion is accomplished here by purging where fuel leakage might be expected, using air.

Figure 3A:
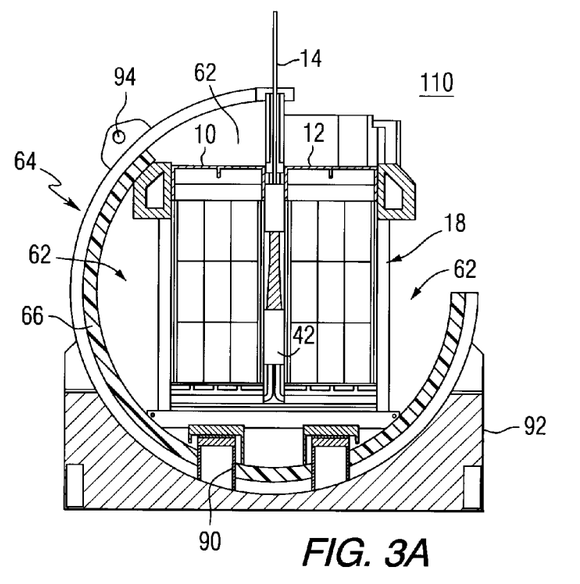
FIGS. 3A and 3B, which best illustrate the invention, show cross-sectional views of several close packed SOFC generators enclosed in a horizontally disposed pressure vessel having two ends, where there is an air accumulation volume between the generators and the pressure housing, with flow of air shown, where 3A is an end view and 3B is a side view.
Figure 3B:
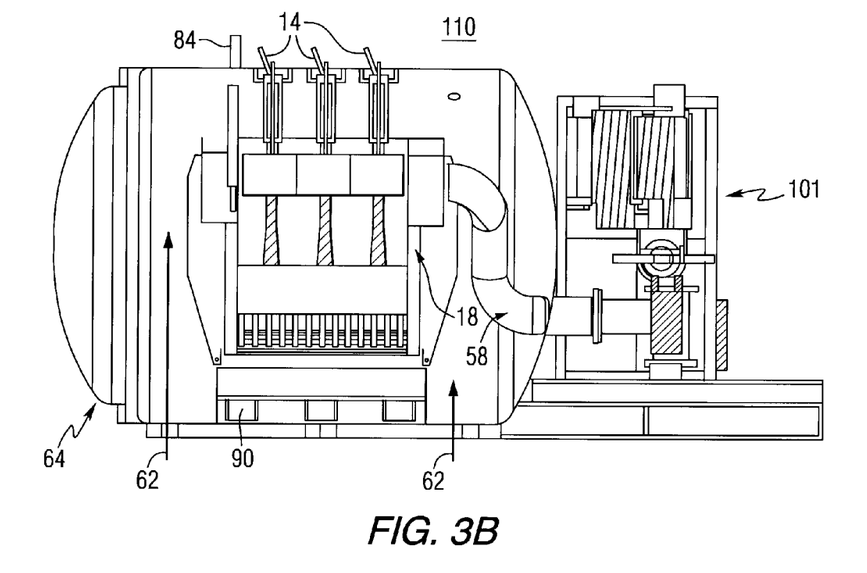

The general approach of this invention, as shown in FIGS. 3A and 3B, is to control unwanted, excess, unreacted fuel in the air accumulation space volume 62 outside the module housing 18, or canister, around the fuel cell subassembly modules 10 and 12, and to have at least about 3 times more free air volume so air and fuel at the same pressure will always react to dispose if unwanted fuel. This is essential.

The generator fuel cell stack assembly modules are enclosed within a high strength, low temperature pressure vessel 64 are enclosed for pressure containment, and provide gas purge flow within the pressure vessel, in the air accumulation volume, or space, 62, to prevent the build-up of combustible gas. The module housing, or canister, 18 around the cell stack separates feed fuel from the air. This invention also creates conditions within the pressure vessel 64, such that if fuel leaks into the purge gas it will ignite locally instead of building up to form an explosive mixture. However, as mentioned previously, the air pressure will be higher than the gaseous fuel pressure so that under most circumstances purge gas will keep gaseous fuel out of the air accumulation space 62.

FIG. 3A shows SOFC modules within the module housing 18 surrounded in part by thermal insulation 66, contained within the pressure vessel 64. The insulation 66 would contain a great many minute passageways within its bulk volume where, even if the entire purge volume were filled with insulation, such insulation would still act as an accumulation for purge oxidant. As mentioned previously, the insulation is usually alumina-silica based, and preferably of 70 vol. % to 90 vol. % porosity, that is, from 10% of theoretical density to from 30% of theoretical density.

Since the SOFC's operate at temperatures near 1000° C., thermal insulation 66 is usually required between the inner canister, that is the module housing 18, and the pressure vessel wall 64 to prevent high temperatures at the pressure vessel wall. Using ceramic fiber board or blanket insulation with the purge gas volume 62 and possible air cooling of the module housing 18, pressure vessel wall temperatures between 25° C. and 150° C. are achievable, so that the pressure vessel can be constructed of carbon steel, which is a relatively inexpensive material. Air is supplied to the inside of the SOFC's through for example, a flow sensor, and air feed tubes (neither shown) from a compressor. A portion of the fuel and process air is combined electrochemically within the SOFC's to produce DC current, heat and fuel oxidation products. The unconsumed fuel is burned in air in the combustion chamber above the cells. Power lines 84 are also shown.

In operation, fuel and air, will all be pressurized as described previously. In this invention the air will have a higher pressure than the fuel. The air passes into the air accumulation space or volume 62 and circulates around the fuel cell stack subassembly modules, such as 10 and 12, between the module housing 18 and the pressure vessel 64. This circulation of combination oxidant/purge gas will dilute any unreacted feed fuel which might have migrated/leaked from the modules. The flow rate of the air will be in an amount effective to provide SOFC operation and also prevent an explosive mixture of air and fuel gas. Also shown in FIGS. 3A and 3B are module supports 90 and 92 and pressure vessel lifting holes 94. A micro turbine/generator/air compressor system 101 associated with the fuel cell generator apparatus 110 is also shown. The main air entry 24 from the air compressor is not shown here but can be seen in FIGS. 4 and 5. Exhaust gas outlet for the fuel cell assembly module is shown as 58.

Figure 4:
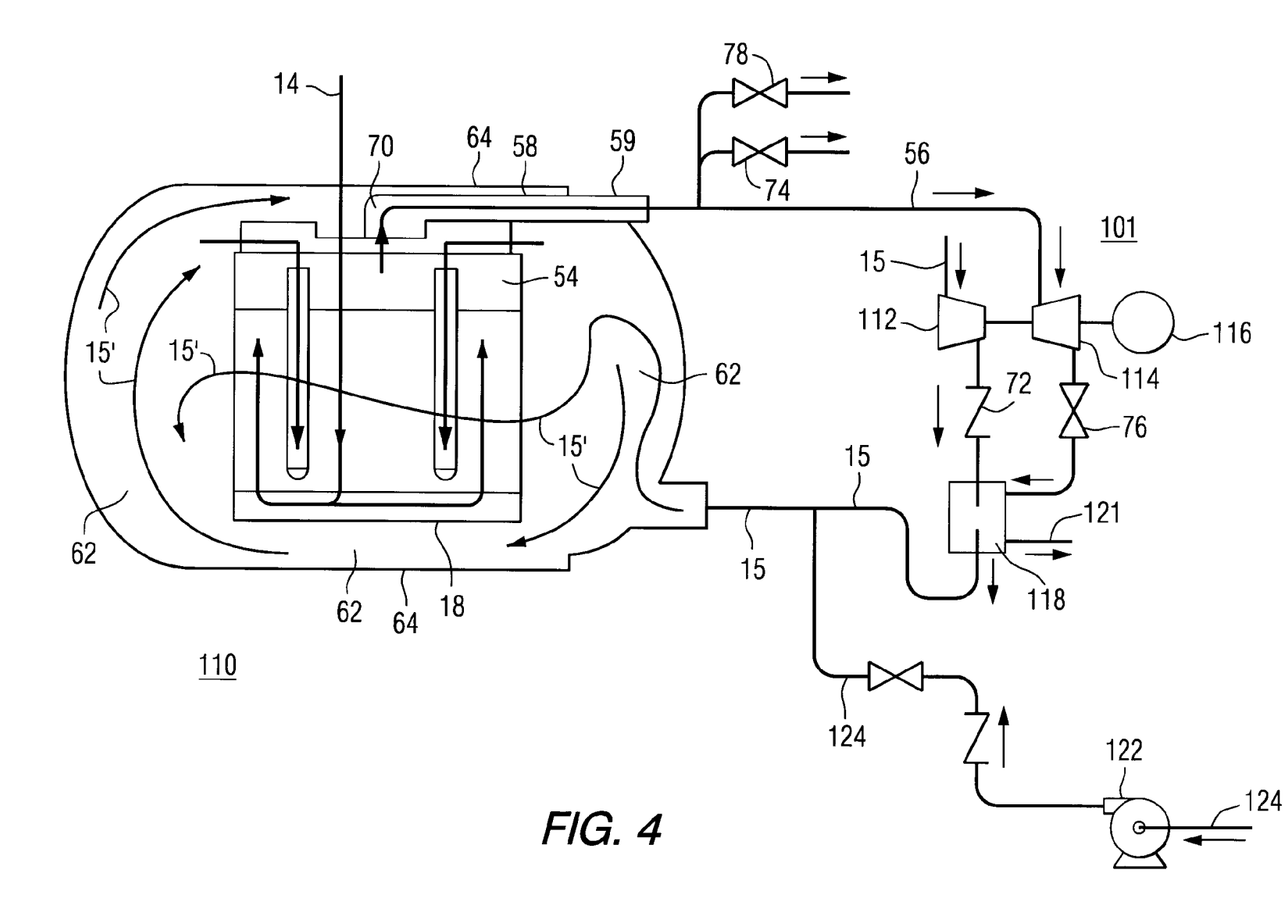
FIG. 4, shows a schematic diagram of one embodiment of a fuel cell generator apparatus with an associated turbine generator system which includes a compressor for supply air which provides a compact power block.

Referring now to FIG. 4, the combustion products from the combustion chamber 54 exhaust from the pressure vessel 64 through internal flow passages 70 which are a relatively small portion of the total pressure vessel interior volume. The exhaust gas flow path is directed out of the vessel by insulation structures and ductwork 59 outside the module housing 18. Once again, the pressure outside of the exhaust ducts is higher than inside, so that leaks in the exhaust ducts will cause air to leak in, rather than exhaust to leak out. This has advantages in assuring that the pressure vessel 64 wall is not likely to be overheated by a leak in the exhaust system.

Very significantly, the arrangement of FIG. 4 has significant advantages during shutdown events. In the event of a system depressurization, the gas flow rate from the fuel volume and the gas flow rate from the air volume will be in proportion to their respective volumes and temperatures, assuming no other flows are introduced into the vessel during the depressurization. This is true, regardless of the depressurization rate. Air 15 from the shell side can only exit the pressure vessel by flowing through the cells to the exhaust, or by flowing backwards through an air inlet valve 72. If the shell side volume is sufficiently large and the leakage through the air inlet valve 72 is low compared to the exhaust flow, the shell side volume acts as an integral air accumulator to provide the required high pressure process air flow to the cells during shutdown events. If the shell side volume is four or five times that of the fuel volume, the flow coefficient for leakage through the air inlet valve 72 can be as much as 10% of that through a turbine bypass valve for depressurization 74 and an exhaust block valve 76 without producing a threat to the cell integrity. The volume ratio of free fuel:free air is from about 1:3–6, preferably from 1:4–5 so that all the fuel can be burned.

Also shown in FIG. 4 is a turbine bypass valve for cooling 78. The micro system 101 contains air compressor 112, gas turbine 114, generator 116 and recuperator 118 with exhaust stream 121. An optional low pressure (up to 2 psi) auxiliary air pump 122 for auxiliary air 124 is also shown. This air pump 122 provides air to the SOFC after depressurization to consume remaining fuel and cool the SOFC to ambient temperature. Air purge gas flow 15' is shown in the air accumulation space 62 between the module housing 18 and pressure vessel 64 during steady state operation, that is about 1 minute to 5 minutes after start-up. The oxidant purge gas flow 15' is open and free, without piping, within the air accumulation space 62 which may contain porous insulation (not shown) where the space 62 acts as an accumulator/storage for pressurized air, which is also a purge gas so that it is available in case, for example compressor 112 needs emergency repairs or unexpectedly shuts down, eliminating the main source of oxidant 15. During normal steady state operation valves 72 and 76 are open and valves 74 and 78 closed. During normal shutdown the valves temporarily remain in this configuration while system 101 continues to run by extracting stored heat from the fuel cell stacks.

Air 124 would be used primarily after steady state operation, for cooling. Also, if, during a deliberate shutdown there is some problem with the turbine 114, the exhaust block valve 76 will be closed and the turbine bypass valve for depressurization 74 opened to control the maximum rate at which the vessel will depressurize.

In this design the air accumulation volume 62 can be sized to accommodate all shutdown scenarios making it possible to eliminate two auxiliary high pressure air systems. In addition, action is not required from any control system to initiate the oxidant/purge gas flow, it is instantaneous. As long as valve 72 actuates in response to flow reversal, the oxidant/purge gas will automatically provide air flow as the system depressurizes. Thus, detection of a surge condition and actuation of the valves 76, 74 and 78 serves only to control the depressurization rate and prevent damage to the cells. Since control action is not required to initiate the accumulated air flow, the system can be designed to protect from damage to the cells by providing air/fuel in the proper ratio when pressurized. This adds a degree of intrinsic safety to the design.

Figure 5:
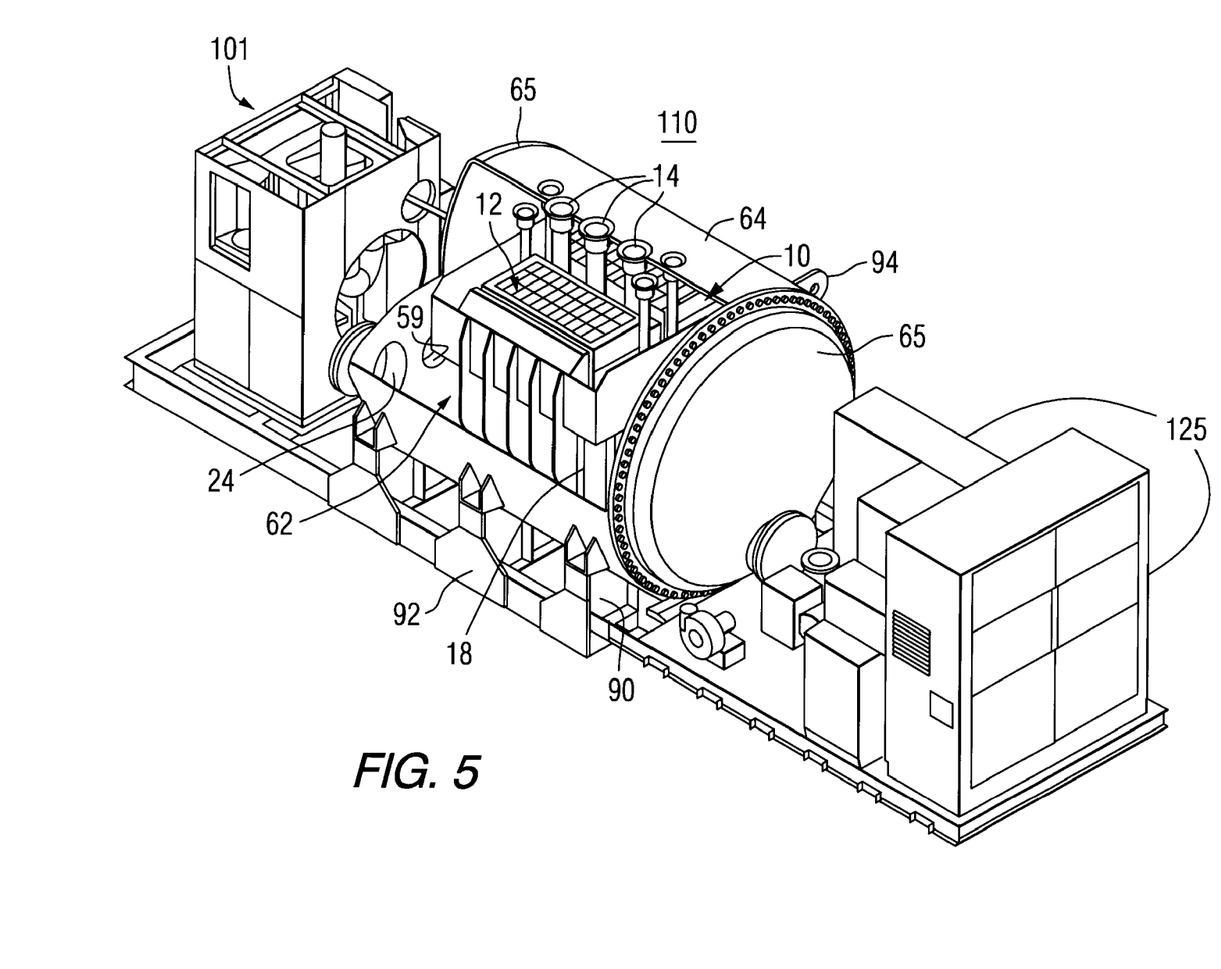
FIG. 5, shows a cross-sectional view of a pressurized fuel cell generator apparatus showing the main oxidant entry and the main vessel exhaust gas outlet.

FIG. 5, shows a three-dimensional cut away view further illustrating the main air entry 24, the micro turbine/compressor system 101, control system 125, tubular or cylindrical pressure vessel 64 and vessel ends 65.

Figure 6:
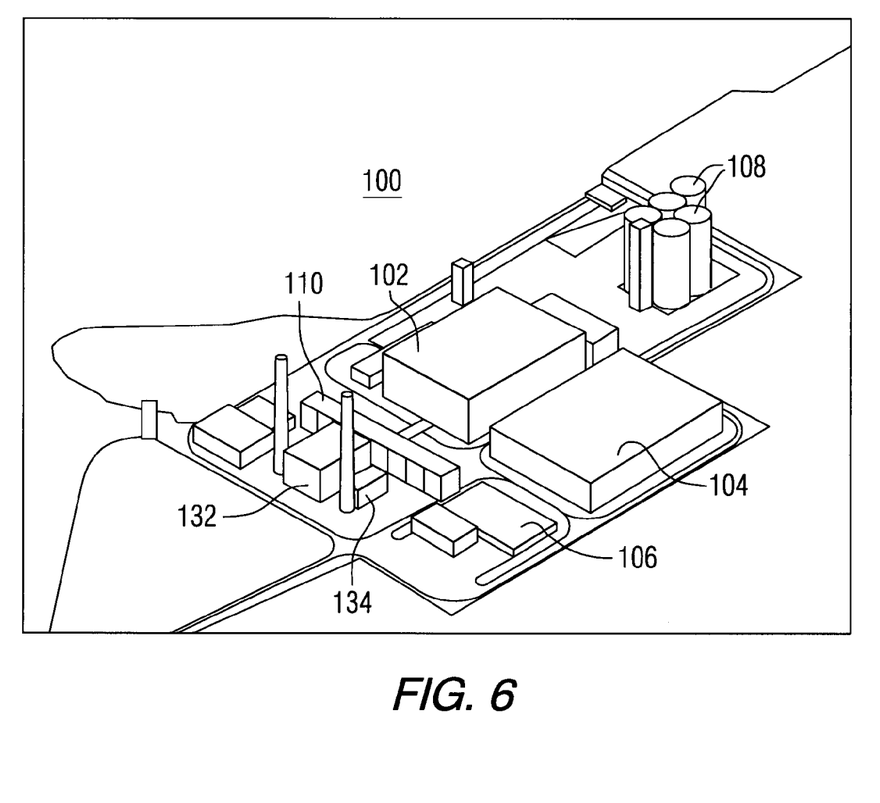
FIG. 6, shows one embodiment of a 300 MW integrated coal gasification/fuel cell-steam turbine power plant, utilizing a plurality of fuel cell generators, such as shown in FIGS. 3A and 3B.

FIG. 6, depicts a very large, integrated coal gasification/fuel cell steam turbine power plant 100 possibly about 300 MW. Coal gasification unit 102, air separation (oxygen) plant 104, DC/AC conversion and electrical switch gear and power conditioning unit 106 are shown, along with five, 50,000-ton coal storage silos 108. The fuel feed from the coal gasification units can operate SOFC apparatus 110, described previously, which in turn are associated with a heat recovery steam turbine 132' heat recovery steam generator 134'.

The fuel cell generator apparatus of this invention can also be used very advantageously with a small combustion turbine system to form a 3 MV plant. The plant would be well suited for the cogeneration, power quality and distributed power markets and is suitable for siting within a light industrial one. The power system could be based on a combustion turbine that is intercooled, recuperated, and reheated. The intercooled, recuperated gas turbine engine would provide pressurized air to the generator, and the hot exhaust gas from the fuel cells could be expanded through a radial inflow power turbine. A single stage air-to-air intercooler could be used to reduce compressor work and to increase the efficiency of the recuperator. While the fuel cells have been generally described as SOFC, other types of fuel cell, could be used in such systems, as described previously. These are only one of the designs that could use the fuel cell generator apparatus of this invention.

While the invention has been described in terms of preferred embodiments, various changes, additions and modifications may be made without departing form the scope of the invention as set forth in the following claims.

What is claimed is:

1. A fuel cell generator apparatus comprising:
   at least one fuel cell assembly module containing a plurality of fuel cells, each fuel cell having electrolyte between an air electrode and a fuel electrode;
   a module housing enclosing the module;
   a pressure vessel having two ends surrounding the module housing, such that there is an air accumulation space between the module housing and the pressure vessel where the pressure vessel has fuel gas inlet tubing connecting to a module fuel gas inlet;
   an air compressor associated with a gas turbine generator system capable of supplying compressed air through an air inlet valve at a pressure between about 50.6 kPA to about 506 kPA higher than the fuel gas and providing a volume of fuel:air of from about 1:3 to 6;
   a compressed air inlet connecting to the air accumulation space where air occupies the air accumulation space and then flows to a fuel cell module air inlet, where air can only exit the pressure vessel by flowing forward through the module fuel cells or flowing backward through the air inlet valve; and
   an exhaust gas outlet connecting to a module exhaust gas outlet;
   where the air accumulation space provides an air accumulator with sufficient volume to control any unreacted fuel gas flow from the module by dilution with air to react with any unreacted fuel gas within the module upon shut-down of the apparatus, and to provide high pressure air flow to the fuel cells upon shut-down of the apparatus.

2. The fuel cell generator apparatus of claim 1, wherein both the air and fuel gas are pressurized, and the volume of fuel:air is from about 1:4 to 5.

3. The fuel cell generator apparatus of claim 1, wherein both air and fuel gas are pressurized over about 196.4 kPA.

4. The fuel cell generator apparatus of claim 1, wherein both air and fuel gas are pressurized and where the air inlet valve will actuate in response to backward air flow, to maintain pressurized air flow to the fuel cells upon shut-down.

5. The fuel cell generator apparatus of claim 1, wherein the air accumulation space contains insulation having a porosity of from about 70 vol. % to about 90 vol. %.

6. The fuel cell generator apparatus of claim 1, wherein the fuel cells are tubular solid oxide electrolyte fuel cells, and the pressure vessel is tubular.

7. A method of operating a fuel cell generator apparatus comprising:
(1) passing fuel gas, through a fuel inlet and into a plurality of fuel cell assembly modules, each module containing a plurality of fuel cells, each fuel cell having electrolyte between an air electrode and a fuel electrode, where the modules are each enclosed by a module housing and where the module housings are surrounded by an axially-elongated pressure vessel having two ends, such that there is an air accumulation space between the module housings and the pressure vessel, the fuel gas also passing through the pressure vessel enclosing the modules and through a tube within the air accumulation space to the fuel inlet;
(2) passing pressurized air from an air compressor associated with a gas turbine generator through an air inlet valve at a pressure between about 50.6 kPA to about 506 kPA higher than the fuel gas, providing a volume of fuel:air of from about 1:3 to 6, where the air passes through the pressure vessel and into the air accumulation space to circulate within the air accumulation space, where the air then passes into the fuel cell module through a module air inlet, where the air can only exit the pressure vessel by flowing forward through the module fuel cells or by flowing backward through the air inlet valve, and where the air dilutes any unreacted fuel gas flow from the module and where the air accumulation space provides an air accumulator with sufficient volume to react with any unreacted fuel gas; and
(3) passing exhaust gas and any unreacted fuel gas out of the pressure vessel.

8. The method of claim 7, wherein the accumulated air will react with any unreacted fuel gas if the air compressor is shut-down and the air inlet valve will actuate in response to backward air flow to provide high pressure air flow to the fuel cells if the air compressor is shut-down, and where the volume ratio of fuel:air is from about 1:4 to 5.

9. The method of claim 7, wherein both air and fuel gas are pressurized, and the pressure vessel is tubular.

10. The method of claim 7, wherein both air and fuel gas are pressurized over about 196.4 kPA.

11. The method of claim 7, wherein the air accumulation space contains insulation having a porosity of from about 70 vol.% to about 90 vol. %.

12. A fuel cell generator apparatus comprising:
at least one fuel cell assembly module containing a plurality of fuel cells and a fuel gas inlet;
a pressure vessel surrounding the module forming an air accumulation space between the module and the vessel; and
an air compressor associated with a gas turbine generator system capable of supplying compressed air at a pressure between about 5.0 kPA to about 506 kPA higher than the fuel gas,
wherein the air accumulation space provides an air accumulator with sufficient volume to control any unreacted fuel gas within the module upon shut-down of the apparatus.

13. The fuel cell generator apparatus of claim 12, further comprising a module housing enclosing the at least one fuel cell assembly module.

14. The fuel cell generator apparatus of claim 13, wherein the module housing is arranged between the at least one fuel cell assembly module and the pressure vessel.

15. The fuel cell generator apparatus of claim 12, wherein the pressure vessel has a fuel gas inlet tubing connected to the module fuel gas inlet and where the compressor is capable of providing a volume of fuel:air from about 1:3 to 6.

16. The fuel cell generator apparatus of claim 12, further comprising a compressed air inlet connected to the air accumulation space where air occupies the air accumulation space and then flows to a module air inlet, and where the air accumulation space provides high pressure air flow to the fuel cells upon shutdown of the apparatus.

17. The fuel cell generator apparatus of claim 12, further comprising an exhaust gas outlet connected to a module exhaust gas outlet.

\* \* \* \* \*